July 13, 1954       W. KASTEN       2,683,536
FILTER
Filed March 27, 1950
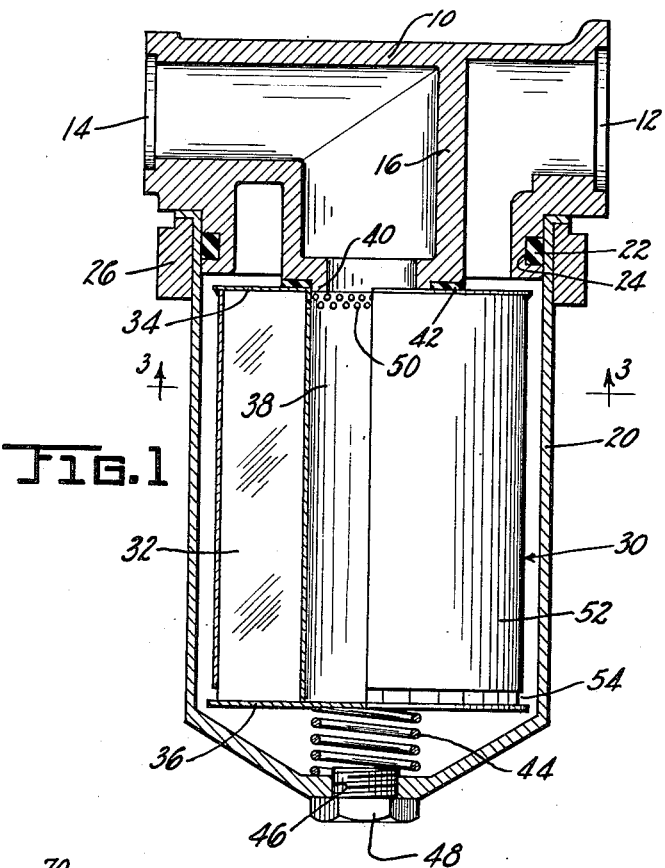
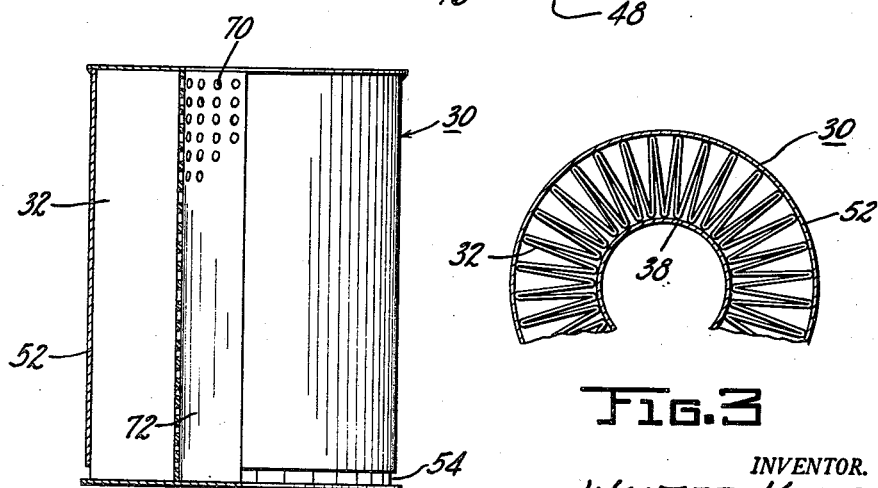
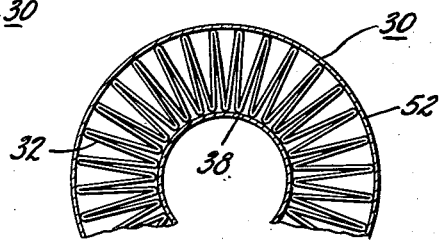
INVENTOR.
WALTER KASTEN
BY
M. A. Hobbs
ATTORNEY Patented July 13, 1954

2,683,536

UNITED STATES PATENT OFFICE 2,683,536

FILTER

Walter Kasten, Detroit, Mich., assignor to Bendix Aviation Corporation, South Bend, Ind., a corporation of Delaware Application March 27, 1950, Serial No. 152,231

5 Claims. (Cl. 210—167)

1

The present invention relates to fluid purifying devices, and more particularly to a novel element for said devices.

In fluid filters of the surface filtration type, the foreign matter removed from the fluid accumulates on the surface of the filter element, forming a layer which gradually increases in thickness and density to a point where the operation of the filtering device may become unsatisfactory. In order for the element to continue in operation, the layer of foreign matter is usually removed by a backwashing operation which, as the term indicates, entails the reversal of fluid flow through the filter element. In conventional elements of the surface filtration type, the backwashing operation leaves a small amount of foreign matter on the element which gradually builds up with each backwashing operation into an adherent permanent coat, eventually decreasing the efficiency of the element to the point where replacement thereof is necessary. It is, therefore, one of the principal objects of the present invention to provide a novel element for the aforesaid devices, wherein the layer of foreign matter accumulated during filtration is so fully removed during the backwashing operation that the life of the element is greatly increased over that of similar conventional elements.

Another object of the present invention is to provide an element for a filtering device wherein the tendency of the foreign matter to form an adherent permanent coat is entirely eliminated or greatly minimized.

Another object of the invention is to provide a filter element in which the fluid flow during backwashing is so controlled that the efficiency of the backwashing operation is greatly increased over that of similar conventional elements.

A further object of the invention is to provide a relatively simple easily fabricated fluid purifying element, such as a filter element, which has high efficiency in both the purification and backwashing operations.

Still another object of the invention is to provide a fluid purifying device which can be readily and thoroughly cleaned by a backwashing operation.

Additional objects and advantages of the present invention will appear from the following description and accompanying drawing, wherein:

Figure 1 is a cross-sectional view of a filtering device embodying my invention, showing the filter element in partial cross section;

Figure 2 is a partial cross sectional view of a modified form of my filter element shown in Figure 1; and Figure 3 is a fragmentary cross-sectional view of the filter element taken on line 3—3 of Figure 1.

Referring more specifically to the drawing, numeral 10 designates a filter head in which are provided a fluid inlet passage 12, a fluid outlet passage 14, separated from one another in the

2 filter head by a circular-shaped wall 16 formed integrally with the internal portion of the head. The inlet and outlet passages are provided with an annular recess for receiving suitable fittings for installation of the device in a fuel line or the like. Brackets (not shown) preferably formed integrally with the head, are provided for mounting the device on an engine or other mechanism. A bowl 20 sealed by a gasket 22 in groove 24 extends downwardly from the lower side of head 10 and is secured in place by a ring 26 bolted to said head. A by-pass (not shown) may be provided in the filter head to permit the fluid to pass directly from inlet passage 12 to outlet passage 14 when the filter element becomes clogged with foreign matter to the extent that the fluid flow therethrough is substantially restricted.

The filter element, generally designated as numeral 30, consists of vertically pleated side walls 32 of resinous impregnated paper or other suitable filtering medium, disc-like plates 34 and 36 cemented to the ends of the side walls at the top and bottom, respectively, and a tube or core 38 which, together with said plates, gives substantial rigidity to the element side walls and retains said walls in a cylindrical shape. Plate 34 contains a central opening which permits element 30 to slip over an annular projection 40 on the lower side of head 10 and to seat on a gasket 42 about said projection. In the device shown in the drawing, a spring 44 disposed between the lower end of filter 30 and the bottom of bowl 20 urges said element to its seat on gasket 42. An opening 46 normally sealed by a plug 48 is provided in the lower end of the filter bowl 20 for draining fluid from the filtering device during the cleaning operation.

Tube 38, which may be of any suitable material, such as sheet metal, is provided with a series of perforations 50 arranged in rows around the upper edge of said tube. The fluid, on passing through the pleated side walls, flows upwardly between said walls and the external surface of tube 38, thence through perforations 50, and outwardly through outlet passage 14. A cylindrical shell 52 of resinous impregnated paper or other suitable material, sealed at the top to plate 34, encloses the entire side walls of the element, with the exception of an annular space 54 near the bottom of the element, and functions as a baffle to cause the fluid to pass parallel with the pleats of the side walls, particularly during the backwashing operation, as will be explained more fully hereinafter. The annular space 54 provided between the lower end of cylinder 52 and plate 36 is preferably made as narrow as possible without substantially restricting the flow of fluid through the filter element. The feature consisting of the tube with the perforations confined to one end is specifically claimed in application Serial No. 152,025, filed on March 27, 1950, by Hanns P. Winzen.

In the operation of the filtering device illustrated in the drawing, fluid such as gasoline enters the device through inlet passage 12, flows downwardly into bowl 20 around the outside of filter element 30, and thence passes through space 54, pleated paper side walls 32 and perforations 50 of tube 38, leaving the device through outlet passage 14. As the fluid passes through the filter element, the foreign matter, such as grit, water, sludge and the like, collects on the external surface of the side walls; gradually forming a layer which eventually materially restricts the flow of fluid therethrough. After the layer has increased to a thickness or density such that the differential in pressure from the inlet to the outlet has increased a predetermined amount, the operator reverses the flow of fluid through the element by closing off the inlet passage 12, removing plug 48 and introducing fluid through outlet passage 14. In this backwashing operation, the fluid flows downwardly from outlet passage 14, passes through perforations 50, side walls 32 and flows downwardly along the outside surface of the pleats and thence passes outwardly through space 54 to opening 46 in the bottom of the bowl. By directing the fluid so that it flows not only through the side walls but also parallel with the pleats of the side walls adjacent the outside surface thereof, foreign matter which has collected thereon is first loosened and partially removed by the fluid passing through the walls and is then washed away by the fluid flowing between the pleats along the outside surface thereof. As the fluid passes outwardly through space 54, any sediment which has accumulated at the bottom of the pleats on plate 36 is removed by the action of the fluid sweeping over said plate.

The modification shown in Figure 2 is similar to that shown in Figure 1, but instead of limiting the holes to a small area at the top of tube 38, the holes are distributed over the entire surface of said tube. The shell 52 performs the same functions in this embodiment as in the one previously described. In the filtering operation, the fluid passes inwardly through space 54, through side walls 32, perforations 70 of tube 72, and thence upwardly to the outlet passage 14 of the filtering device. In the backwashing operation, the fluid passes through the perforations of tube 72, thence through the side walls and downwardly along the outside surface of the side walls between the pleats thereof, washing the surface free of the deposited foreign matter and then leaving the element through annular space 54. While considerably more efficient in the backwashing operation than similar conventional filter elements, the arrangement shown in Figure 2 is not as efficient as the one shown in Figure 1 in which the flow of fluid along the outside surface of the pleats is concentrated by holes 50 confined to the upper end of tube 38.

The present invention is not limited to any particular type of filtering device, container or housing, and the filter element may be either used singly as shown in Figure 1, or may be one of many in a large filtering device. Modifications may be made in the element itself, including changes in size, shape, design and materials, to suit requirements.

I claim:

1. A filter element comprising a cylindrical core having perforations adjacent only one end, filter material around said core in close proximity thereto pleated in a direction longitudinal with the axis thereof, plates closing the ends of said pleats, and a substantially imperforate shell covering a major portion of said element in contact with said pleated material sealed to the plate adjacent the perforated end of the core and spaced from the other of said plates.

2. A filter element comprising a cylindrical core having perforations concentrated at one end thereof, filter material around said core and in contact therewith pleated in a direction longitudinal with the axis thereof, plates closing the ends of said pleats, and a substantially imperforate shell covering a major portion of said element in contact therewith sealed to the plate adjacent the perforated end of said core and spaced from the other of said plates.

3. A filter element comprising a cylindrical core having perforations concentrated at one end thereof, filter material of a resinous impregnated paper around said core joined thereto and pleated in a direction longitudinal with the core axis, impervious plates closing the ends of said pleats, and an imperforate cylindrical shell around and covering a major portion of said pleated material joined thereto and sealed to the one of said plates nearest the perforated end of the core and spaced from the other of said plates.

4. A filtering device comprising a head having a fluid inlet passage and a fluid outlet passage, a bowl connecting said passages, a cylindrically-shaped element interposed between said passages including a cylindrical core having perforations confined to one end thereof, filter material around said core and in close proximity thereto pleated in a direction longitudinal with the core axis, pleats closing the ends of said pleats, and a substantially imperforate cylindrical shell disposed around, in contact with, and covering a major portion of said pleated material, said shell being sealed to the one of said plates nearest said core perforations and spaced from the other of said plates.

5. A filtering device comprising a head having a fluid inlet passage and a fluid outlet passage, a bowl connecting said passages, a cylindrically-shaped element interposed between said passages including a cylindrical core having perforations confined to one end thereof, filter material of a resinous impregnated material around said core and in close proximity thereto pleated in a direction longitudinal with the axis thereof, impervious plates closing the ends of said pleats, and a substantially imperforate cylindrical shell disposed around, in contact with, and covering a major portion of said pleated material, said shell being sealed to the one of said plates nearest said core perforations and spaced from the other of said plates.

References Cited in the file of this patent

UNITED STATES PATENTS

| Number | Name | Date |
|---|---|---|
| 2,226,045 | Baldwin | Dec. 24, 1940 |
| 2,239,868 | Williams | Apr. 29, 1941 |
| 2,287,344 | Easton et al. | June 23, 1942 |
| 2,372,286 | Mieras | Mar. 27, 1945 |
| 2,429,321 | La Brecque | Oct. 21, 1947 |
| 2,464,036 | Hasselwander | Mar. 8, 1949 |
| 2,468,603 | Pew | Apr. 26, 1949 |

FOREIGN PATENTS

| Number | Country | Date |
|---|---|---|
| 401,287 | Great Britain | Oct. 30, 1933 |